United States Patent Office 3,697,345
Patented Oct. 10, 1972

3,697,345
PROCESS FOR PREPARING POLYIMIDE LAMINATES
Robert W. Vaughan, Manhattan Beach, and Hyman R. Lubowitz, Hawthorne, Calif., assignors to TRW Inc., Redondo Beach, Calif.
No Drawing. Continuation-in-part of application Ser. No. 738,403, June 20, 1968. This application Nov. 10, 1969, Ser. No. 875,523
The portion of the term of the patent subsequent to Feb. 23, 1987, has been disclaimed
Int. Cl. B32b 5/28, 31/12; C09j 5/06
U.S. Cl. 156—155                                12 Claims

ABSTRACT OF THE DISCLOSURE

This invention is directed to a process for preparing reinforced resin laminates or plastic composites of improved thermal stability and low void content which comprises impregnating a substantially fibrous material e.g., glass fibers with an effective amount of an organic solution of a precursor of an imide prepolymer i.e., a polyamide-acid. The precursor-impregnated fibrous material is heated to a temperature ranging up to about 300° F. to remove part of the solvent and thereby obtain an intermediate product which may be characterized as having tack and drape. Subsequently, the polyamide-acid is imidized, in situ, to the prepolymer and cured by the application of heat e.g., temperatures ranging from about 250° F. to 700° F. and, with pressures ranging up to about 1000 p.s.i. Under these conditions, the prepolymer is cured to form a reinforced thermoset plastic composite. The precursor of the imide prepolymer i.e., the polyamide-acid is prepared by coreacting approximately stoichiometric amounts of at least one polyfunctional amine with a mixture of anhydrides consisting essentially of at least one polyfunctional anhydride and monoanhydride having the formula:

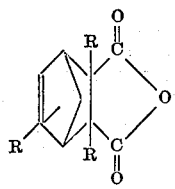

wherein R is selected from the group consisting of hydrogen and lower alkyl radicals having 1 to 5 carbon atoms per molecule.

---

This application is a continuation-in-part of co-pending application Ser. No. 738,403 filed on June 20, 1968, now U.S. Pat. 3,565,549, which in turn is a continuation-in-part of co-pending application Ser. No. 650,625 filed on July 3, 1967, now U.S. Pat. 3,528,950.

This invention relates to reinforced laminates or plastic composites of improved thermal stability and low void content and to the process of preparing same which comprises impregnating various reinforcing materials e.g., glass and carbon fibers, etc. with an effective amount of an organic solution containing a polyamide-acid precursor. Part of the organic solvent e.g. up to about 85% is removed from the impregnated material by subjecting said material to a temperature ranging up to about 300° F. to obtain an intermediate product which may be characterized as having good tack and drape. Subsequently, the polyamide-acid is imidized, in situ, at a temperature ranging from about 250° F. to 700° F. initially to form comparatively low molecular weight imide prepolymers, which are cured under pressure at the high temperatures. These prepolymers are cured to form a thermoset-reinforced plastic composite.

The polyamide-acids hereinafter referred to as the precursors of the imide prepolymers are prepared by coreacting approximately stoichiometric amounts of at least one polyfunctional amine with a mixture of anhydrides consisting essentially of at least one polyfunctional anhydride and a monoanhydride characterized by the formula:

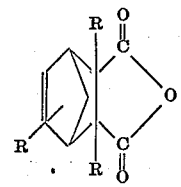

wherein R is selected from the group consisting of hydrogen and lower alkyl radicals having 1 to 5 carbon atoms per molecule.

More particularly, this invention relates to a polyimide-resin reinforced composite e.g., glass laminates prepared by impregnating a reinforcing material with a precursor of a polyimide prepolymer which is capable of being pyrolitically polymerized, in situ, to a high-molecular weight thermoset polyimide having an average molecular weight of at least 10,000. These polyimide resins are formed, dispersed throughout the reinforcing materials, by applying an organic solution of the polyamide-acid to the fibrous material followed by heating said material at a temperature ranging from room temperature up to about 300° F. whereby part of the solvent is removed to obtain an intermediate product characterized as having good tack and drape. Instead of directly curing the intermediate at temperatures ranging up to 700° F., these intermediate products may be heated to temperatures ranging up to about 500° F. where said polyamide-acids are imidized to relatively low-molecular weight polyimide prepolymers which have average molecular weight ranging from about 500 to 6,000 and are highly stable at ambient temperatures. Then with the additional application of heat e.g., temperatures ranging up to about 700° F., the polyimide prepolymers are cured, in situ, to form the reinforced polyimide plastic composites of improved thermal stability and characterized as having a low void content i.e., less than 2%.

Presently, the polyimide-reinforced laminates are known primarily because of their outstanding physical and chemical properties and particularly because of their stability at elevated temperatures. Thus, because of these and other attractive characteristics, the polyimide-reinforced composites e.g., glass laminates have found numerous applications in areas where high-strength and heat-resisting materials are needed. However, while the presently available polyimides are desirable, they are nevertheless economically at a disadvantage because of the difficulties encountered in processing the laminates.

The polyimides prepared heretofore, for example, were obtained by coreacting dianhydrides and diamines to produce the polyamide-acids i.e., amic-acids by chain extension. Materials impregnated with these polyamideacids were required to be hermetically sealed and refrigerated if they were not to be cured within a reasonable time because of their instability at room temperature. Thus, when the polyamide-acid impregnated materials were subsequently cured at elevated temperatures, there was a substantial amount of volatile material given off due to the evaporation of solvent and the imidization of the amide-acid to the corresponding polyimide. Therefore, it became necessary, in curing the amide-acid impregnated materials, to provide a special process whereby an appreciable amount of the volatiles was allowed to escape in order to eliminate the interstitial voids which otherwise would result in the final product. It has been found in accordance with this invention that reinforced polyimide laminates of low void content may be obtained by utilizing an organic solution of the polyamide-acid as the impregnant for the fibrous material followed by a partial removal of the solvent and a subsequent curing which converts the amide-acid to the corresponding polyimide in situ.

Accordingly, it is an object of this invention to provide a process for preparing thermoset polyimide reinforced plastic composites or laminates characterized as having improved thermal stability and a low void content.

It is another object of this invention to provide a process for preparing an impregnated fibrous material containing a polyamide-acid capable of being pyrolitically polymerized to the corresponding polyimide to form a reinforced resin laminate.

It is a further object of this invention to provide a process which comprises impregnating a fibrous material with an organic solution containing an effective amount of a polyamide-acid which is capable of being imidized, in situ, to a low-molecular weight prepolymer capable of being cured by the application of heat to form a thermoset polyimide resin laminate.

It is still a further object of this invention to provide a process wherein a fibrous material is impregnated with an organic solution of a polyamide-acid and subsequently dried to form an intermediate characterized as having tack and drape.

It is still a further object of this invention to provide a reinforced thermoset-resin laminate of improved thermal stability and low void content which is obtained by impregnating a fibrous material with an amide-acid precursor capable of being imidized, in situ, to an imide prepolymer which can be pyrolitically converted to a thermosetting polyimide resin.

These and other objects of this invention will become apparent from a further and more detailed description as follows:

More specifically, this invention relates to a process for preparing thermoset polyimide reinforced plastic composites e.g., glass laminates of improved thermal stability which comprises impregnating a reinforcing material with an organic solution containing an effective amount of a polyamide-acid i.e., the precursor of the imide prepolymer followed by a partial drying at a temperature ranging from room temperature to about 300° F. to remove a substantial amount e.g., up to about 85% by weight of the organic solvent until the desired tack and drape properties are obtained. As an alternative, the intermediate amide-acid i.e., amic-acid impregnated material may be imidized, in situ, at a temperature ranging from about 250° F. to 700° F. After imidization is substantially complete, the temperature may be raised from 500° F. to about 700° F. with pressures ranging up to 1,000 p.s.i. where the imide prepolymer is cured to form the reinforced thermosetting resin composite. These composites or laminates may be characterized as comprising a natural, synthetic, organic, inorganic or metallic fibers drawn together by a low void content resinous matrix obtained from the precursors of the polyimide.

This process particularly provides for the preparation of a tacky, drapable intermediate which may be easily converted by the application of heat to a thermosetting reinforced plastic composite. The polyamide-acids which are used for impregnating the fibrous materials are imidized in situ to low-molecular weight polyimide prepolymers by the application of heat which completes the cyclization reaction and removes the volatiles. The fibrous laminates containing the imide-prepolymers are then cured by subjecting the prepolymers, dispersed throughout the fibrous materials to temperature ranging up to about 700° F. while at pressures ranging from atmospheric to about 1,000 p.s.i. More particularly, glass fabric, for example, may be impregnated with an organic solution of an amic-acid and partially dried at room temperature or at a temperature ranging up to about 300° F. This intermediate product is laid-up on a mold surface and a high temperature vacuum bag is assembled over the lay-up while air is evacuated from the vacuum bag until a pressure of about 5 to 15 p.s.i. is obtained. The lay-up is imidized by heating at a temperature of approximately 375° F. for about 30 minutes. After imidization is complete, the autoclave atmosphere is pressurized to 200 p.s.i. and the temperature is increased from about 550° to 650° F. whereby the imide prepolymer is cured over a period of about one hour.

It has been found that comparatively high-molecular weight polyimide resins can be dispersed throughout the fibrous material e.g., glass or carbon fibers by pyrolitically polymerizing the imide prepolymers which were obtained from the polyamide-acids precursors. The prepolymers formed, in situ, may have molecular weights ranging from about 500 to 6,000 and more preferably from about 1,000 to 3,000. The thermosetting reinforcing composites of this invention are obtained by a curing mechanism which is believed to the unique in that rather than curing the polyamide-acid in a single step, polymerization of the low-molecular prepolymers take place upon fabrication by the application of heat i.e., pyrolitic polymerization without the evolution of a large amount of volatile material. These thermosetting polyimide reinforced composites are thermally stable and for that reason may be used for a variety of purposes particularly in the areospace industry.

The precursors of the imide prepolymers i.e., the polyamide-acids are prepared by coreacting at least one polyfunctional amine with a mixture of anhydrides consisting essentially of polyfunctional anhydrides and a specific monoanhydride in approximately stoichiometric amounts under conditions well known in the art for preparing polyimides. More specifically, at least one polyfunctional amine is reacted with the anhydride mixture which consists essentially of the polyfunctional anhydrides and a specific monoanhydride wherein said monoanhydride is present in the mixture of anhydrides in an amount ranging from about 5.0 to 60 moles percent.

This specific monoanhydride which is characterized as the end-capping group for the imide prepolymers may be characterized by the formula:

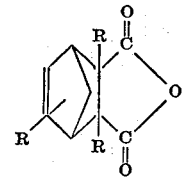

wherein R is selected from the group consisting of hydrogen and lower alkyl radicals having 1 to 5 carbon atoms.

The prepolymers obtained from the polyamide-acids may be characterized as chain extended polyimides of comparatively low-molecular weight i.e., having an average molecular weight ranging from about 500 to 6,000 which contain an aliphatic and/or aromatic backbone with a specific end-capping or terminal group e.g., 3,6-endomethylene - 1,2,3,6 - tetrahydrophthalic anhydride. These particular end-capping groups are stable at room and moderate temperatures but are capable of being made chemically reactive by the application of heat to form cured polyimide resins. While it is not completely understood, it is believed that the monoanhydrides, which are the end-capping groups coreact end to end thereby pyrolitically forming macromolecules having an average molecular weight of at least 10,000. These high-molecular weight resins may be obtained, in situ, from the amic-acids where $x$ has a value ranging from 1 to 30 and preferably from 1–15 as illustrated below:

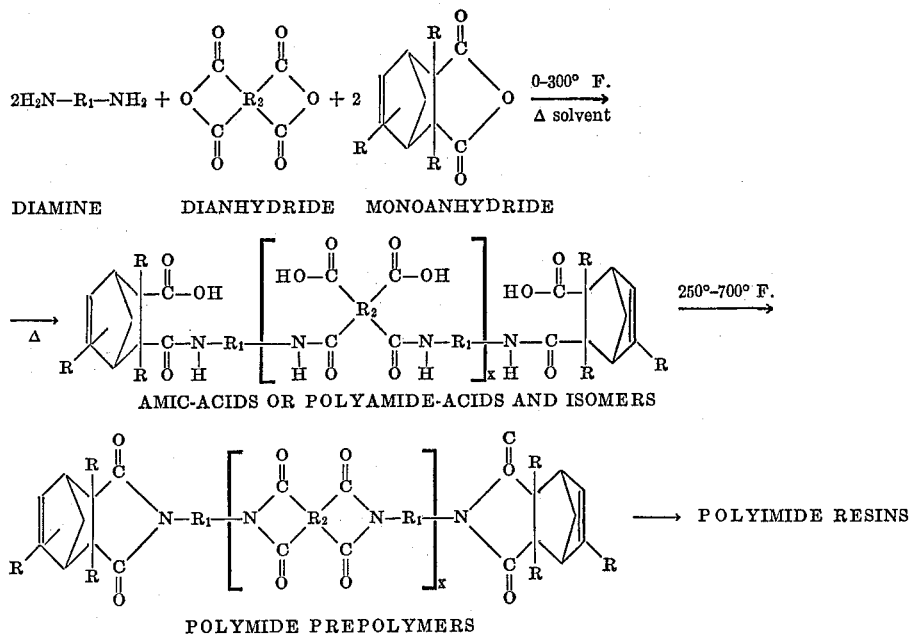

DIAMINE    DIANHYDRIDE    MONOANHYDRIDE

AMIC-ACIDS OR POLYAMIDE-ACIDS AND ISOMERS

POLYIMIDE PREPOLYMERS

→ POLYIMIDE RESINS

In preparing the polyimide precursors for the preparation of the reinforced laminates of this invention, various polyfunctional amines such as the diamines, trimines and tetraamines may be used. However the preferred polyfunctional amines are the diamines including for example:

3-methoxyhexamethylene diamine,
2,5-dimethylhexamethylene diamine,
2,5-dimethylheptamethylene diamine,
5-methylnonamethylene diamine,
1,4-diamino-cyclohexane,
1,12-diamino-octadecane,
2,5-diamino-oxadiazole,
2,2-bis(4-aminophenyl) hexafluoror propane,
N-(3-aminophenyl)-4-aminobenzamide,
metaphenylene diamine,
para-phenylene diamine,
4,4'-diamino-diphenyl propane,
4,4'-diamino-diphenyl methane,
benzidine,
4,4'-diamino-diphenyl sulfide,
4,4'-diamino-diphenyl sulfone,
3,3'-diamino-diphenyl sulfone,
4,4'-diamino-diphenyl ether,
2,6-diamino-pyridine,
bis(4-amino-phenyl) diethyl silane,
bis(4-amino-phenyl) diphenyl silane,
3,3'-dichloro-benzidine,
bis-(4-amino-phenyl) phenyl phosphine oxide,
bis-(4-amino-phenyl)-N-phenylamine,
bis-(4-amino-phenyl)-N-methyl-amine,
1,5-diamino-naphthalene,
3,3'-dimethyl-4,4'-diamino-biphenyl,
3,4'-dimethyl-3',4-diamino-biphenyl,
3,3'-dimethoxy benzidine,
2,4-bis(beta-amino-t-butyl) toluene,
para-bis-(2-methyl-4-amino-pentyl) benzene,
para-bis-(1,1-dimethyl-5-amino-pentyl) benzene,
m-xylylene diamine,
3-methylheptamethylene diamine,
4,4-dimethyl-heptamethylene diamine,
2,11-diamino-dodecane,
1,2-bis(3-aminopropoxy) ethane,
2,2-dimethyl propylene diamine,
1,3-diamino adamantane,
3,3'-diamino-1,1'-diadamantane,
3,3'-diaminomethyl-1,1'-diadamantane,
bis(para-amino-cyclohexyl) methane,
hexamethylene diamine,
heptamethylene diamine,
octamethylene diamine,
nonamethylene diamine, and
decamethylene diamine, The polyfunctional anhydrides which may be employed for purposes of this invention include the following:

bis(3,4-dicarboxyphenyl) methane dianhydride,
bis(3,4-dicarboxyphenyl) sulfone dianhydride,
benzene-1,2,3,4-tetracarboxylic dianhydride,
3,4',3',4'-benzophenone tetracarboxylic dianhydride.
pyromellitic dianhydride,
2,3,6,7-naphthalene tetracarboxylic dianhydride,
3,3'4,4'-diphenyl tetracarboxylic dianhydride,
1,2,5,6-naphthalene tetracarboxylic dianhydride,
2,2'3,3'-diphenyl tetracarboxylic dianhydride,
2,2'-bis(3,4-dicarboxyphenyl) propane dianhydride,
3,4,9,10-perylene tetracarboxylic dianhydride,
bis(3,4-dicarboxyphenyl) ether dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic dianhydride,
phenanthrene-1,8,9,10-tetracarboxylic dianhydride,
2,2-bis(2,3-dicarboxyphenyl) propane dianhydride,
1,1-bis(3,4-dicarboxyphenyl)ethane dianhydride,
bis(2,3-dicarboxyphenyl) methane dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthralene-1,4,5,8-tetracarboxylic dianhydride, and
2,3,6,7-tetrachloronaphthalene-1,4,5,8-tetracarboxylic dianhydride.

The following illustrate the reactants which may be used in preparing the polyamide-acid precursors in accordance with this invention.

EXAMPLE I

Approximately 40.7 parts by weight of 4,4'-methylene dianiline, 32.8 parts by weight of 3,6-endomethylene- 1,2,3,6-tetrahydrophthalic anhydride and 33.9 parts by weight of 3,3'4,4'-benzophenone tetracarboxylic acid dianhydride were dissolved in 170 parts by weight of dimethylformamide.

EXAMPLE II

A solution was prepared by mixing approximately 1,000 parts by weight of dimethylformamide and 100 parts by weight of toluene to which was added 122.7 parts by weight of 4,4-oxydianilene. The solution was stirred until all of the diamine was in solution and 98.4 parts by weight of 3,6 - endomethylene-1,2,3,6-tetrahydrophthalic anhydride and 100.8 parts by weight of 3,3',4,4' - benzophenone tetracarboxylic acid dianhydride were added slowly, with stirring, until a solution was obtained.

EXAMPLE III

Approximately 87.0 parts by weight of 4,4'-oxydianiline were dissolved in a solvent mixture of 700 parts by weight of dimethylformamide and 700 parts by weight of toluene. To this solution was added 65.6 parts by weight of 3,6-endomethylene 1,2,3,6-tetrahydrophthalic anhydride and 63.0 parts by weight of 1,4,5,8-naphthalene tetracarboxylic dianhydride.

EXAMPLE IV

Two solutions were prepared (1) consisting of approximately 57.43 parts by weight of 4,4'-methylene dianiline with 75.0 parts by weight of dimethylformamide and (2) 35.58 parts by weight of 3,6-endomethylene 1,2,3,6-tetrahydrophthalic anhydride with 40.0 parts by weight of dimethylformamide. A third mixture was prepared consisting of approximately 58.36 parts by weight of 3,3',4,4' - benzophenone tetracarboxylic dianhydride with 43.5 parts by weight of dimethylformamide. These preparations were then blended together and reacted to provide a polyamide-acid solution.

The above polyamide-acids were used for impregnating reinforcing materials, i.e., glass cloth by a method which comprised, for example, impregnating the fabric with the precursor of the prepolymers, i.e., the amide-acids prior to complete imidization and then later imidizing the precursors on the cloth to a stable prepolymer. The prepolymer impregnated cloth was subsequently heated to temperatures ranging from 500–700° F. for an hour or more with laminating pressures ranging from about 200–600 p.s.i. More specifically, low void content laminates e.g., with less than 2% total volatiles may be prepared, for example, by utilizing cure cycles of about 650° F. for a period of about 60 minutes at a pressure of about 200 p.s.i. (for a ⅛ inch thick laminate). For thicker laminates, however, an additional cure time of about 30 minutes should be provided for every inch of thickness, e.g., 9/16 to 1 inch thick laminates may be cured in approximately 90 minutes. In addition to glass cloth, other reinforcing materials including silica, graphite, asbestos, etc., may be used in preparing laminated materials which are specially useful in fabricating products such as heat shields and exhaust nozzles for various high temperature purposes.

In preparing solutions of the amic-acids, various organic solvents may be used in amounts ranging from about 20 to 65% weight of solvent. These solvents include for example, organic liquids whose functional groups do not react with the precursors. Normally, organic solvents comprising the N,N'-dialkyl-carboxylamides are useful. The preferred solvents, however, are the lower molecular weight materials including, N,N-dimethylformamide, N,N-dimethylacetamide, N,N-diethylformamide, N,N-diethylacetamide, N,N-dimethylmethoxyacetamide, etc. In addition, solvents which may be used include dimethylsulfoxide, N-methyl-2-pyrrolidone, pyridine, formamide, N-methyl-formamide butyrolactone, etc. These solvents may be used either alone or in combination with other organic liquids including for example benzene, dioxane, butyrolactone, toluene, xylene, cyclohexane, and mixtures thereof.

In impregnating the fibrous material up to about 85% by weight of said fibers may be impregnated with a solution of the polyamide-acid. However where the fibrous material comprises glass and/or carbon fibers, the polyamide-acid solutions may be used in amounts ranging from about 40 to 60% by weight of said fibers. The reinforcing fibrous materials may be selected from a variety of known organic or inorganic materials including for example fibers of carbon, metal, boron, silicates, asbestos, synthetic materials, metal oxides, and particularly glass fibers, e.g., glass mats, etc. Among the fibrous materials, the carbon fibers as disclosed in U.S. Pats. Nos. 3,053,775 and 3,011,981 may be used. These carbon fibers are obtained from rayon and acrylic materials by pyrolitic techniques.

To demonstrate the invention, glass fabric was cut into suitable size panels and impregnated by immersing said panels in an organic solution of the polyamide-acid. The resin-content control was achieved by utilizing squeeze bars which provided a constant gap of 0.018 inch between the bars. The impregnated fabric was dried at a temperature of about 150° F. and was found to have a resin-solid content in the range of about 30% by weight and a volatile content in the range of about 15% by weight. Panels were prepared by laminating 13 plies of the impregnated glass fabric. These panels were subjected to imidization at about 400° F. for about 60 to 90 minutes, cured at 600° F. under 200 p.s.i. for 60 minutes and then cut to flexural test bars. These specimens were used to determine the approximate flexural strength and modulus values at room temperature. The resultant values provided flexural strength in the range of 78,000 p.s.i. for the 60-minutes imidized panels and 76,000 p.s.i. for the panels of the 90-minutes treatment. The flexural moduli for the samples were in a range of 4.1 millions p.s.i. and 3.9 millions p.s.i. respectively. The panels produced from the 60-minutes imidizing cycle were selected for more detailed evaluation as set forth in Table II.

TABLE II.—END PROPERTIES OF LAMINATES FROM PREPREGS HAVING TACK AND DRAPE

| | |
|---|---|
| Reinforcement | Style 181, "E" type glass fabric—A1100 soft finish. |
| Resin | TRW P13N polyimide. |
| Prepreg staging | 12 minutes at 150° F. |
| Molding conditions | 60 minutes at 400° F.—No pressure. 60 minutes at 600° F.—200 p.s.i. pressure. |
| Flexural strength per ASTM D 790 at room temperature. | 82,300 p.s.i. |
| At 550° F. after 30 minutes soak at 550° F. | 67,400 p.s.i. |
| Flexural modulus per ASTM D 790 at room temperature. | 3.89×10⁶ p.s.i. |
| At 550° F. after 30 minutes soak at 550° F. | 3.64×10⁶ p.s.i. |
| Barcol hardness | 75. |
| Resin content | 29.4 percent weight. |
| Void content | 4.5 percent vol. (calculated). |

The results indicate that equivalent properties can be obtained by using the tacky amic-acid prepregs when compared to those obtained when using the standard imidized prepregs as shown in Table III.

TABLE III.—END PROPERTIES OF LAMINATES FROM DRY, IMIDIZED PRESS GRADE PREPREGS

| | | |
|---|---|---|
| Reinforcement | Style 181, "E" type glass fabric—A1100 soft finish. | |
| Resin | TRW P13N polyimide. | |
| Prepreg staging | 4 minutes at 325° F. 4 minutes at 475° F. | |
| Molding conditions | 60 minutes at 600° F.—200 p.s.i. pressure. | |
| Flexural strength per ASTM D 790 at room temperature, p.s.i. | 91,200 | 82,200 |
| At 550° F. after 30 minutes soak at 550° F., p.s.i. | 69,600 | 66,200 |
| Flexural modulus per ASTM D 790 at room temperature, 10⁶ p.s.i. | 3.47 | 3.24 |
| At 550° F. after 30 minutes soak at 550° F., 10⁶ p.s.i. | 3.14 | 2.97 |
| Barcol hardness | 75 | 75 |
| Resin content, percent wt | 24.5 | 34.0 |
| Void content, percent vol. (calculated). | <2.0 | |

Thus by comparing the data in the tables, it is possible to obtain equivalent properties by using the tacky prepregs in place of the imidized prepregs of Table III which were not subjected to a partial drying step prior to imidization. These tacky prepregs may be characterized as comprising a reinforcing fibrous material impregnated with the amic-acids of this invention whereby the solvent has been partially removed prior to imidizing the amic-acid to form the imide. Recent trend towards operating at higher temperatures in the electrical and missile areas has stimulated the activity for the development of heat-resistant resins which may be used for preparing laminated structure of high thermostability and low void content. In accordance with this trend, the laminated composites of this invention were developed for these other purposes and therefore are characterized as having outstanding chemical, physical and thermal stability in addition to a void content i.e., less than about 2% by volume.

Although this invention has been described with respect to a number of specific embodiments, it is obvious that there are other variations and modifications which can be made without departing from the spirit and scope of this invention as particularly pointed out in the appended claims.

What is claimed is:

1. A process for preparing a reinforced laminate of improved thermal stability and low-void content which comprises (1) impregnating a substantially fibrous material with an effective amount of an organic solution containing a polyamide-acid; (2) removing part of the organic solvent from said impregnated-fibrous material to obtain an intermediate characterized as having tack and drape; (3) subsequently curing the polyamide-acid by subjecting said polyamide-acid-impregnated material to temperatures ranging up to about 700° F. at a pressure ranging up to about 1,000 p.s.i. until a reinforced-polyimide laminate is obtained; said polyamide-acid is prepared by coreacting approximately stoichiometric amounts of at least one polyfunctional amine and a mixture of anhydrides consisting essentially of at least one polyfunctional anhydride and a monoanhydride having the formula:

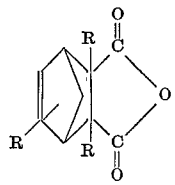

wherein R is selected from the group consisting of a hydrogen atom and lower alkyl radicals of 1 to 5 carbon atoms.

2. The process of claim 1 further characterized in that the fibrous material comprises glass fibers.

3. The process of claim 1 further characterized in that the polyamide-acid is present in the organic solution in an amount ranging from about 20 to 65% by weight of the solvent.

4. The process of claim 3 further characterized in that the solvent comprises N,N'-dialkylcarboxylamide.

5. The process of claim 3 further characterized in that the solvent comprises dimethylformamide.

6. The process of claim 1 further characterized in that the polyfunctional amine comprises at least one aromatic diamine, the polyfuntcional anhydride comprises at least one aromatic dianhydride and the monoanhydride is characterized by said formula wherein R is a hydrogen atom.

7. The process of claim 1 further characterized in that the polyamide-acid is obtained by coreacting approximately stoichiometric amounts of at least one aromatic diamine and a mixture of an aromatic dianhydride and said monoanhydride wherein the monoanhydride ranges from about 5.0 to 60 moles percent of the anhydride mixture.

8. The process of claim 1 further characterized in that the polyamide-acid has an average molecular weight ranging from about 500 to 3,000.

9. The process of claim 1 further characterized in that the fibrous material is impregnated with up to about 85% by weight of said material with the polyamide-acid solution.

10. The process of claim 9 further characterized in that up to about 90% by weight of the organic solvent is removed from the polyamide-acid impregnated fibrous material prior to curing.

11. The process of claim 10 further characterized in that the polyamide-acid is converted to the polyimide by subjecting said amide-acid impregnated material to temperatures ranging from about 400° to 600° F. at a pressure ranging from about 200 to 600 p.s.i.

12. The process of claim 2 further characterized in that the fibrous material comprises carbon fibers.

References Cited

UNITED STATES PATENTS

| | | | |
|---|---|---|---|
| 3,151,011 | 9/1964 | Troeleman et al. | 156—180 |
| 3,259,670 | 7/1966 | Weltman et al. | 156—331 X |
| 3,520,753 | 7/1970 | Ryan et al. | 156—155 X |
| 3,531,369 | 9/1970 | Baumann et al. | 156—155 X |
| 3,531,439 | 9/1970 | Fukushima et al. | 156—148 |
| 3,541,057 | 11/1970 | Kreuz | 156—331 X |

CARL D. QUARFORTH, Primary Examiner

R. S. GAITHER, Assistant Examiner

U.S. Cl. X.R.

117—126; 156—180, 181, 331; 260—78